June 24, 1930. G. L. McCASSEY ET AL 1,767,150
MEANS AND METHOD OF ACCLIMATIZING FUR BEARING ANIMALS
Filed Oct. 25, 1928 2 Sheets-Sheet 1
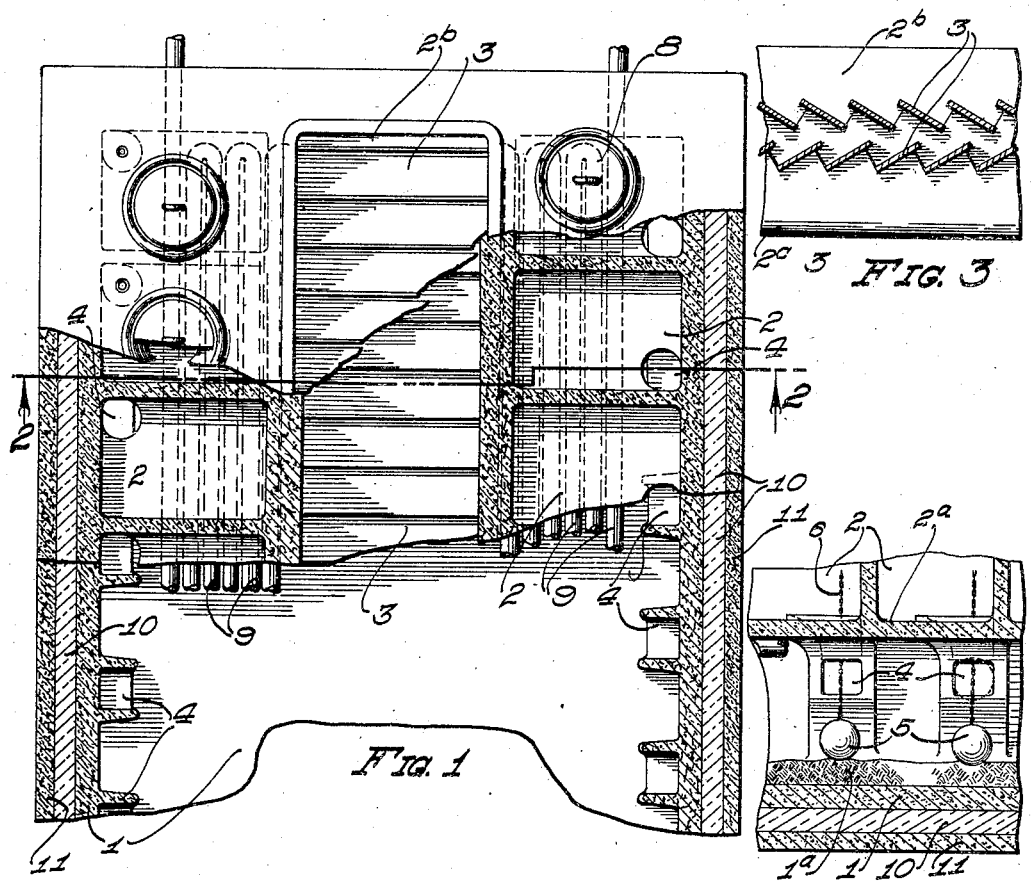
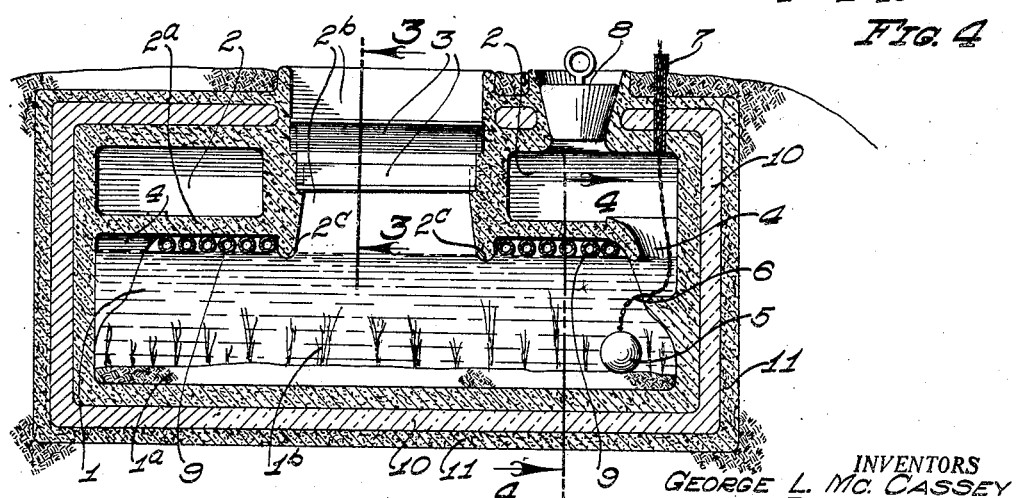
INVENTORS
GEORGE L. McCASSEY
RALPHE H. COX
BY
A. B. Bowman
ATTORNEY June 24, 1930.  G. L. McCASSEY ET AL  1,767,150
MEANS AND METHOD OF ACCLIMATIZING FUR BEARING ANIMALS
Filed Oct. 25, 1928  2 Sheets-Sheet 2

INVENTORS.
GEORGE L. McCASSEY
RALPHE H. COX
BY
A. B. Bowman
ATTORNEY

Patented June 24, 1930

1,767,150

UNITED STATES PATENT OFFICE

GEORGE L. McCASSEY AND RALPHE H. COX, OF SAN DIEGO, CALIFORNIA, ASSIGNORS TO ACCLIMATED FUR FARM, OF SAN DIEGO, CALIFORNIA, A SPECIAL PARTNERSHIP

MEANS AND METHOD OF ACCLIMATIZING FUR-BEARING ANIMALS

Application filed October 25, 1928. Serial No. 314,904.

Our invention relates to a means and method of acclimatizing fur bearing animals and the objects of our invention are: First, to provide a means and method of this class which reproduces the conditions of nature most suited for producing luxurious growth of fur upon fur bearing animals; second, to provide a means and method of this class which controls the breeding and growth of fur bearing animals; third, to provide a means and method of this class in which the animal at a suitable period of its life is submitted to a gradually decreasing temperature causing it to grow a luxurious fur; fourth, to provide a means and method of this class in which a tank of water is gradually decreased in temperature over a period of days or weeks and then maintained at a temperature just above the freezing point by means of a refrigerating system associated therewith; fifth, to provide a means and method which is especially adapted for the raising of fur bearing animals whose natural habitat is adjacent to water; sixth, to provide a means of this class in which artificial nests and a tank of water are all surrounded by suitable insulating means and connected with a refrigerating system for controlling the temperature thereof; seventh, to provide a means of this class in which the heat loss in maintaining a desired cool temperature is reduced to a minimum, yet the animal is able to receive sufficient air and light for healthy growth; eighth, to provide on the whole a novel method of acclimatizing animals, and ninth, to provide a means of this class which is extremely simple of construction proportional to its functions, durable, efficient in its action and which will not readily deteriorate or get out of order.

Figure 5:
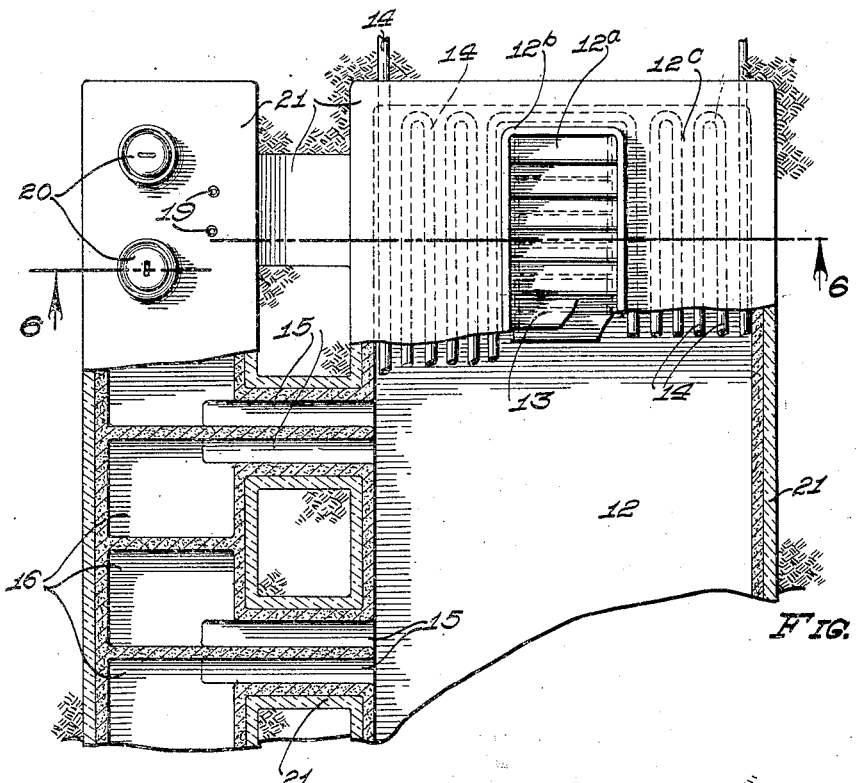
Figure 7:
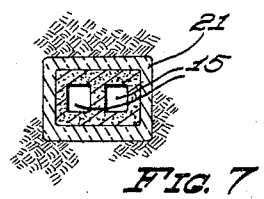
Figure 6:
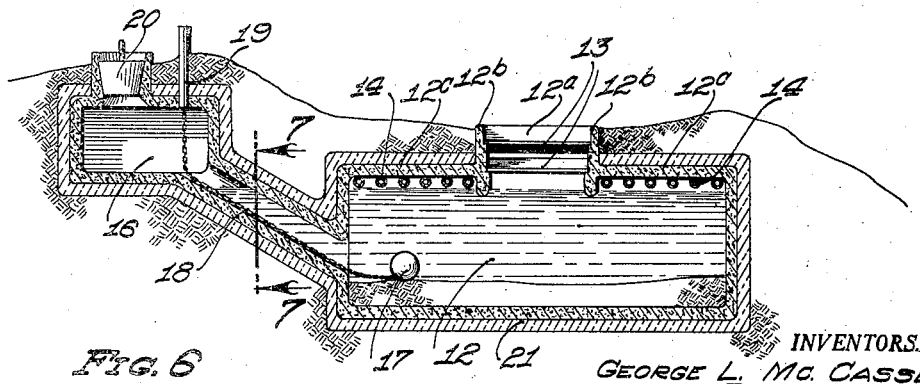

With these and other objects in view as will appear hereinafter, our invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is a plan view of our animal acclimatizing means with parts and portions broken away and in section to facilitate the illustration; Fig. 2 is a transverse sectional view thereof through 2—2 of Fig. 1 with parts and portions shown in elevation to facilitate the illustration; Fig. 3 is a fragmentary sectional view through 3—3 of Fig. 2; Fig. 4 is a fragmentary sectional view through 4—4 of Fig. 2; Figs. 5, 6 and 7 illustrate a slight modification, of which Fig. 5 is a plan view with parts and portions broken away and in section to facilitate the illustration; Fig. 6 is a transverse sectional view through 6—6 of Fig. 5 with parts and portions shown in elevation to facilitate the illustration, and Fig. 7 is a fragmentary transverse sectional view through 7—7 of Fig. 6.

Similar characters of reference refer to similar parts and portions throughout the several views of the drawings.

The tank 1 of the structure shown in Figs. 1, 2, 3 and 4, is substantially rectangular in plan and in cross-section. The tank is preferably made or formed of concrete, or other suitable material which will contain water, and is set partly or wholly below the normal level of the ground, as shown best in Fig. 2. Positioned above and partially covering the upper side of the tank 1 is a plurality of dens 2. These dens are also formed of concrete or other suitable material and are preferably integral with the tank 1, as shown best in Figs. 2 and 4 of the drawings. Each den is relatively small and is substantially rectangular in shape. When the tank 1 has the proper amount of water in it the floors $2^a$ of the dens are spaced a short distance above the water level, as shown in Fig. 2.

The dens do not wholly close the upper side of the tank 1 but leave a space $2^b$ for outside air to reach the tank. This space $2^b$ is provided with a plurality of angularly positioned slat members 3 arranged in staggered relation so as to prevent direct light or heat from the surrounding air from coming in contact with the water of the tank, at the same time permitting sufficient circulation for the breathing of the animals within the tank.

Each den 2 is provided with an entry 4 which is in the form of a short passage, extending down the side wall and communicating with the tank below the normal water level thereof, as shown best in Figs. 1, 2 and 4 of the drawings. This entry may be closed when desired by means of a stopper 5 secured to a chain 6 which extends through a pipe 7 positioned in the upper side of the den 2 and protruding therefrom, as shown best in Fig. 2 of the drawings. Access to each den 2 is made through a suitable cover 8.

The water in the tank 1 is maintained at a desired temperature by means of refrigerating pipes 9 which extend along the under sides of the dens between the floors 2ª thereof and the normal upper surface of the water within the tank 1. Ridges 2ᶜ along the inner, under sides of the dens 2 form a part of the side walls of the opening 2ᵇ and serve as baffles for preventing heat from the opening 2ᵇ coming in contact with the refrigerating coils 9.

The floor of the tank 1 is covered with suitable soil 1ª for the growing of plants 1ᵇ, if desired. Otherwise mere sand may be used.

The outer sides of the tank 1 and dens 2 are covered wherever possible or practicable with heat insulating material 10. In some cases where the moisture of the ground would deteriorate the insulation a capping 11 of the material used in the construction of the tank is placed around the insulation. After this is done earth is placed over the top and sides of the dens and around the sides of the tank if the tank was not originally positioned below the normal grade of the ground in order to further insulate the tank and dens.

In the modification shown in Figs. 5, 6 and 7, the tank 12 is made similar to the tank 1. The tank 12 is completely enclosed except for an opening 12ª extending longitudinally over the central portion of its upper side, as shown in Figs. 5 and 6 of the drawings. This opening 12ª is provided with side walls 12ᵇ which support slats 13 in angular relation, as shown in Fig. 5. Along the under surface of the portions 12ᶜ covering the upper side of the tank 12 are positioned a plurality of refrigerating pipes 14.

Connected with the tank 12 through passages 15 are a plurality of dens 16. The passages 15 are preferably arranged in pairs so as to facilitate their construction. These passages intersect the tank 12 near the floor thereof, as shown best in Fig. 6. The passages 15 are adapted to be closed by a stopper 17 connected to a chain 18 which passes through a small pipe protruding from each den 16 in a manner described in the first structure. A cover 20 affords access to each den 16. The dens 16 are preferably positioned to one side of the tank 12 a sufficient distance so as to be positioned above the normal water level of the tank and yet be connected thereto by means of gradually sloping passages which intersect the tank near the lower portion thereof. The tank 12, passages 15, and dens 16 are covered wherever possible by insulating material 21 and the insulating material is covered with earth, as shown in Fig. 6.

Our method of acclimatizing animals is as follows: As the means before described is especially adapted for the muskrat we shall use this animal as an illustrative example. The young muskrat is raised under normal conditions in a suitable place the temperature of which need not be regulated. Upon reaching its full growth or almost its full growth, the muskrat is transferred to one of the tanks illustrated in the accompanying drawings. The temperature of the water is normal when the muskrat is placed in the tank. Temperature of the water is then gradually decreased by means of a refrigerating system connected with the refrigerating pipes. As the temperature gradually decreases the fur of the muskrat grows longer and more thick in order to compensate for the decrease in temperature.

By properly controlling the rate by which the temperature is decreased the muskrat is kept in a healthy condition best suited for the growing of good fur. After a sufficient length of time which may be determined by examining the muskrats they are killed and the furs removed. In order to continue the process, a sufficient number of the muskrats are kept in the tank and the temperature thereof is gradually increased, simulating the condition during spring. When the tanks have reached normal temperature again, the gestation period follows. Thus, by controlling the temperature of the tank it is possible to increase the productivity of the muskrats by providing conditions simulating two, three or even more seasonal cycles per year.

Though we have shown and described a particular means and method for acclimatizing animals for their furs, we do not wish to be limited to this particular means nor to this particular method but desire to include in the scope of our invention the means and method substantially as set forth in the appended claims.

Having thus described our invention, what we claim as new and desire to secure by Letters Patent is:

1. The herein described method of artificially acclimatizing fur bearing animals consisting in raising said animals under normal conditions until partly grown, then placing said animals in a temperature controlled tank having dens associated therewith, and then artificially and gradually reducing the temperature of said tank for a required length of time.

2. The herein described method of artificially acclimatizing fur bearing animals consisting in raising said animals under normal conditions until partly grown, then placing said animals in a temperature controlled tank having dens associated therewith, then artificially and gradually reducing the temperature of said tank, and then maintaining said tank at said reduced temperature until the fur of said animal has reached the normal length and thickness for said temperature.

3. The herein described method of artificially acclimatizing fur bearing animals consisting in raising said animals in temperature controlled tanks having dens associated therewith, then artificially and gradually reducing the temperature of said tanks, then maintaining the temperature of said tanks at said reduced temperature until the fur of said animal has reached the normal length and thickness for said temperature, then removing some of said animals for market, then gradually increasing the temperature in said tank to simulate the conditions of spring, then maintaining said tank in normal temperature during the breeding and growing period, and then again submitting said animals to a gradually decreasing temperature.

4. In a means of acclimatizing animals, a tank, a refrigerating system associated therewith for controlling the temperature of said tank, and dens connected with said tank.

5. In a means of the class described, a partially enclosed tank containing water, a refrigerating system associated therewith for controlling the temperature of said tank, and dens connected with said tank positioned above the normal water level thereof.

6. In a means of acclimatizing animals, a tank, a refrigerating system associated therewith for controlling the temperature of said tank, dens connected with said tank, and insulation means surrounding said tank and said dens.

7. In a means of the class described, a partially enclosed tank containing water, a refrigerating system associated therewith for controlling the temperature of said tank, dens connected with said tank positioned above the normal water level thereof, and insulation means surrounding said tank and said dens.

8. In a means for acclimatizing animals, a tank partially closed over its upper portion and partially filled with water, baffle means positioned over the open portion of said tank, refrigerating means associated with said tank for controlling the temperature thereof, and a plurality of dens connected with said tank and positioned above the normal water level thereof.

9. In a means for acclimatizing animals, a tank partially closed over its upper portion and partially filled with water, baffle means positioned over the open portion of said tank, refrigerating means associated with said tank for controlling the temperature thereof, a plurality of dens positioned above the normal water level of said tank, and passages connecting said dens with said tank.

10. In a means for acclimatizing animals, a tank partially closed over its upper portion and partially filled with water, baffle means positioned over the open portion of said tank, refrigerating means associated with said tank for controlling the temperature thereof, a plurality of dens positioned above the normal water level of said tank, passages connecting said dens with said tank, and means operated from the outside of said dens for closing said passages.

11. In a means for acclimatizing animals, a tank partially closed over its upper portion and partially filled with water, baffle means positioned over the open portion of said tank, refrigerating means associated with said tank for controlling the temperature thereof, a plurality of dens positioned above the normal water level of said tank, a passage connecting said dens with said tank, means operated from the outside of said dens for closing said passage, insulating means surrounding said dens and said tank for reducing the absorbing of heat.

12. In a means for acclimatizing animals, a tank partially closed over its upper portion and partially filled with water, baffle means positioned over the open portion of said tank, refrigerating means associated with said tank for controlling the temperature thereof, a plurality of dens connected with said tanks and positioned above the normal water level thereof, and insulating means surrounding said dens and said tank for reducing the absorption of heat.

In testimony whereof, we have hereunto set our hands at San Diego, California, this 17th day of October, 1928.

GEORGE L. McCASSEY.
RALPHE H. COX.